United States Patent
Sekine et al.

(10) Patent No.: US 6,476,869 B1
(45) Date of Patent: Nov. 5, 2002

(54) IMAGE PROCESSING SYSTEM AND METHOD USING SYSTEM CHARACTERISTIC AND IMAGE INFORMATION

(75) Inventors: Masayoshi Sekine, Tokyo (JP); Shigeyuki Suda, Kanagawa-ken (JP); Yasuyuki Unno, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/185,304

(22) Filed: Jan. 19, 1994

Related U.S. Application Data (63) Continuation of application No. 08/058,533, filed on May 6, 1993, now abandoned, which is a continuation of application No. 07/534,728, filed on Jun. 7, 1990, now abandoned.

(30) Foreign Application Priority Data

Jun. 9, 1989 (JP) .............................. 1-147812

(51) Int. Cl.[7] ......................... H04N 5/225; H04N 5/228
(52) U.S. Cl. ...................... 348/335; 348/208; 348/232; 386/117
(58) Field of Search ................................. 348/207, 208, 348/335, 345, 232; 358/335, 906, 310, 909.1; 360/5, 6, 27; 386/48, 39, 117, 107, 30–32; H04N 5/225, 5/30, 5/31

(56) References Cited

U.S. PATENT DOCUMENTS

| | | | | |
|---|---|---|---|---|
| 4,097,893 A | * | 6/1978 | Camras | |
| 4,714,959 A | * | 12/1987 | Pshtissky | |
| 4,733,296 A | * | 3/1988 | Honbo et al. | |
| 4,827,333 A | * | 5/1989 | Iwabe | |
| 4,837,632 A | * | 6/1989 | Kubo et al. | |
| 4,851,897 A | * | 7/1989 | Inuma et al. | |
| 4,855,814 A | * | 8/1989 | Shiraishi et al. | |
| 4,873,580 A | * | 10/1989 | Katoh et al. | |
| 4,901,160 A | * | 2/1990 | Kinoshita et al. | |
| 5,113,247 A | * | 5/1992 | Akiyama et al. | 348/241 |

FOREIGN PATENT DOCUMENTS

GB  2116397  * 9/1985 ............ H04N/5/14

OTHER PUBLICATIONS

Real Time Correction of Deviation of Dynamic Registration Caused By Lens, Technical Report, TEBS 96–4, 1984.*
Image Distorsion from Zoom lenses, Rebiai et al, IEE, London, UK, Date: 1992.*
Image Distorsion From Zoom Lenses: modeling and digital correction, Rebiai et al, IBC 1992 (Conf. Publ. No. 358, P: 438–441), IEE London, UK, 1992.*

* cited by examiner

*Primary Examiner*—Tuan Ho
(74) *Attorney, Agent, or Firm*—Robin, Blecker & Daley (57) ABSTRACT

In a system for transmitting a video signal obtained by a camera to a discrete device either via a recording/reproducing system or via a transmission line, an image processing system includes a circuit which is arranged within the camera to generate a photo-taking state signal indicating information on aberrations in particular; and a correction circuit which is arranged within a device for reproducing or receiving the video signal to correct the aberrations of the video signal in accordance with the photo-taking state signal.

32 Claims, 6 Drawing Sheets

IMAGE PROCESSING SYSTEM AND METHOD USING SYSTEM CHARACTERISTIC AND IMAGE INFORMATION

This is a continuation application under 37 CFR 1.62 of prior application Ser. No. 08/058,533, filed May 6, 1993, now abandoned, which is a continuation of Ser. No. 07/534,728 filed Jun. 7, 1990 (now abandoned).

BACKGROUND OF THE INVENTION

1. Field of the Invention

This invention relates to an image processing system and more particularly to an image processing system which is arranged to correct the aberration of a photo-taking optical system in an image recording/reproduction system or a transmission system.

2. Description of the Related Art

The photo-taking optical system of a video camera or the like is designed to minimize the aberration thereof. Despite the design, however, it is inevitable to have some degree of aberration remaining. A method for digitally correcting the residual aberration has been disclosed in an article entitled "Real Time Correction of Deviation of Dynamic Registration caused by Lens" and appeared in the "Technical Reports", TEBS 96-4, 1984, of the Television Society.

In accordance with the above-stated prior art method, optical information such as the focal length, the focusing state, the aperture value, etc. of the photo-taking lens is read out from a lens barrel part and an aberration taking place in the photo-taking state of the lens is computed (or an aberration value which has been computed and stored in a memory is read out); and the aberration is corrected by controlling mainly the scanning position of a camera tube.

Figure 6A:
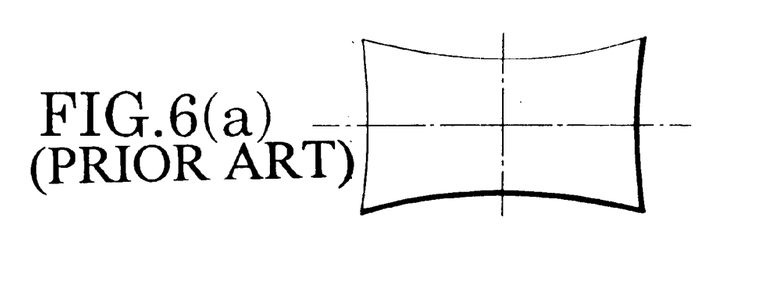
FIGS. 6(a) to 6(d) are illustrations of aberrations.
Figure 6B:
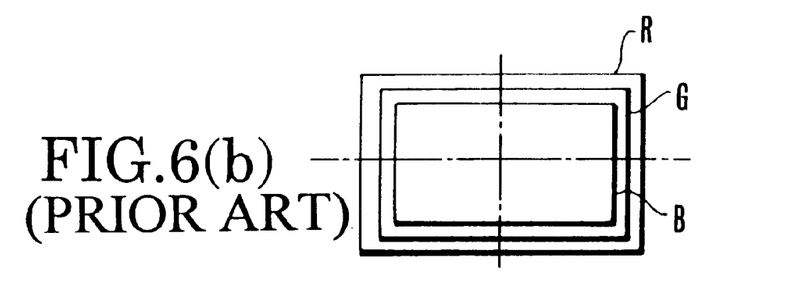
Figure 6C:
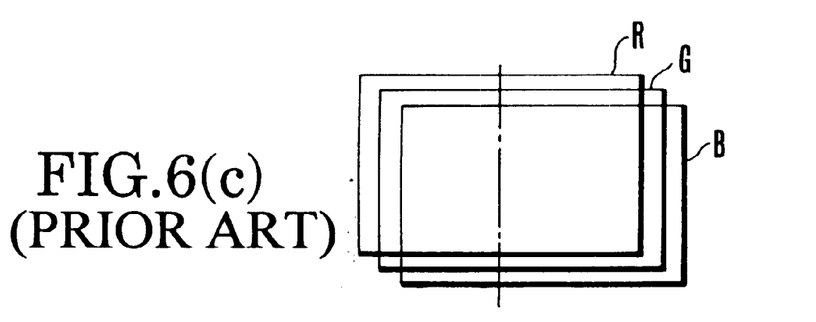
Figure 6D:
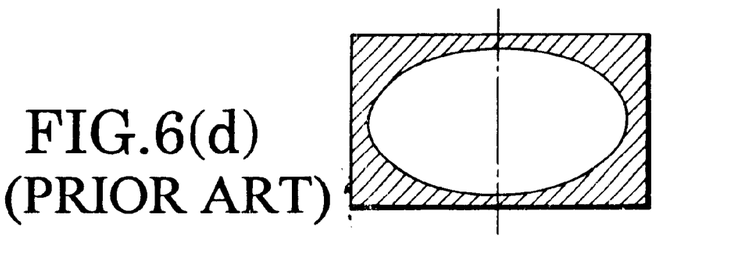

The term "aberration" as used herein includes an image distortion which is shown in FIG. 6(a) of accompanying drawings; a lateral chromatic aberration shown in FIG. 6(b); parallel color deviation shown in FIG. 6(c); and a shading as shown in FIG. 6(d). The aberrations shown in FIGS. 6(a), 6(b) and 6(d) result from the optical factors of the photo-taking lens and depend on the state of the lens. The aberration shown in FIG. 6(c), on the other hand, either results from an error in mounting position of the camera tube, a solid-state image sensor or the like or results from rattling, slanting and decentering which take place while the lens is moved.

The aberration correcting method mentioned above is intended to obtain an aberration-corrected signal when it is output from the camera tube and is thus applicable only to the camera tube. It is not applicable to a solid-state image sensor, because: In the case of the solid-state image sensor, many photo-electric conversion elements are fixedly arranged in a matrix-like state. Their positions are thus invariable. Further, the use of the camera tube is undesirable because of its large size, a high cost and a short life. It is, therefore, impractical to use camera tubes and, hence, the above-stated method for general consumer appliances.

It is conceivable to solve the above-stated problem by temporarily storing image information output from a solid-state image sensor in an image storage device which is composed of a semiconductor memory and by subjecting it to an aberration correcting process. However, the image storage device must be arranged to permit random access. Then, a large address circuit is necessary for random access. In addition to that, the method necessitates use of a large, high-speed computing circuit in carrying out address computation for aberration correction. This increases the size and weight of the camera.

SUMMARY OF THE INVENTION

It is, therefore, an object of this invention to provide an image processing system which is capable of giving a substantially aberration-corrected image signal without causing the inconveniences mentioned above.

The image processing system according to this invention is characterized in that: In a system for transmitting a video signal obtained by a camera to a recording/reproducing device or to a discrete device via a transmission line, the camera is provided with generation means for generating a photo-taking state signal which is arranged to indicate the aberration. In combination with this, the video signal reproducing or receiving device is provided with correction means for correcting and adjusting the aberration of the video signal according to the photo-taking state signal received.

The above-stated generation means enables the video signal reproducing or receiving device to know information on the aberration or a camera shake taking place in shooting. The video signal thus can be corrected by the correcting means according to such information. The correcting action does not require the camera itself to have any large special circuit. Therefore, the camera can be arranged to be compact in size and light in weight. Since the condition of each individual shot is detectable, the correction can be appositely accomplished according to the condition. A picture thus can be obtained in high quality. Further, since the shooting condition is not to be detected from the video signal, the correcting means can be arranged in a relatively simple manner.

The above and further objects and features of the invention will become apparent from the following detailed description of embodiments thereof taken in connection with the accompanying drawings.

DETAILED DESCRIPTION OF THE PREFERRED EMBODIMENTS

Figure 1:
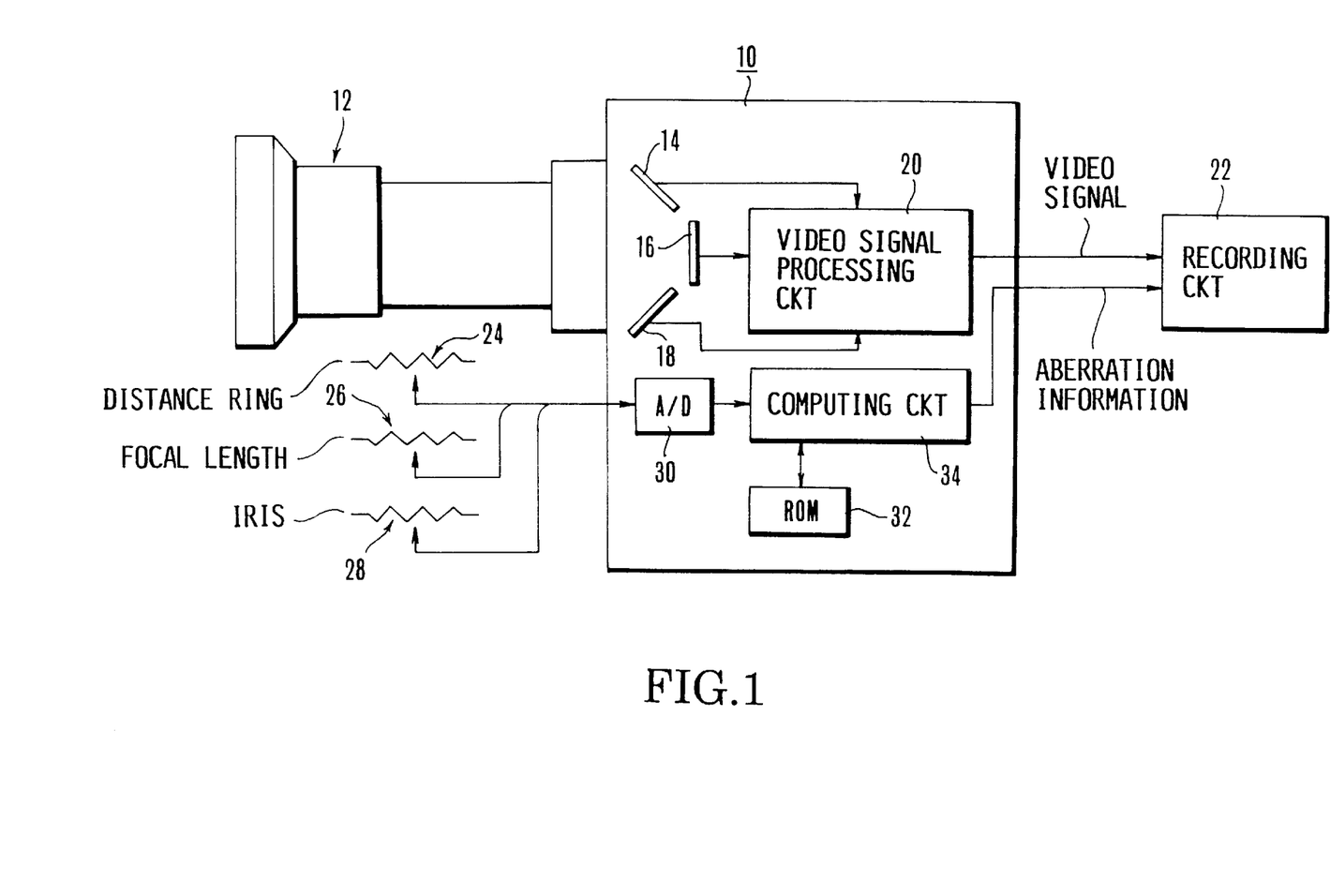
FIG. 1 is a block diagram showing the arrangement of a photo-taking and recording apparatus arranged as an embodiment of this invention.

Some embodiments of this invention are described below with reference to the accompanying drawings:

An embodiment of the invention which is included in a system for transmitting a picked up image through an image recording/reproducing system to a video tape is first described. FIG. 1 shows in a block diagram the arrangement of a video camera included in the embodiment of the invention. Referring to FIG. 1, the video camera 10 comprises a zoom lens 12; solid-state image sensors 14, 16 and 18 which are arranged to form signals of red (R), green (G) and blue (B) colors respectively; and a video signal processing circuit 20 which are arranged to form a color video signal by performing known processes on the outputs of the solid-state image sensors 14, 16 and 18. A recording circuit 22 is arranged to record the color video signal output from the video signal processing circuit 20 on a video tape together with an aberration information code which will be described later herein. The recording circuit 22 can be arranged either in one body with the video camera 10 or separate from the video camera 10.

To detect the state of a zoom lens 12, the video camera 10 is provided with a potentiometer 24 which is arranged to detect the rotational position of the distance ring (indicating the object distance) of the zoom lens 12; a potentiometer 26 which is arranged to detect the focal length of the zoom lens 12: and another potentiometer 28 which is arranged to detect the aperture value of an iris. An A/D (analog-to-digital) converter 30 is arranged to digitize the outputs of the potentiometers 24, 26 and 28. A ROM 32 is arranged to store aberration information codes which have previously been obtained according to the conditions (the object distance, the focal length and the iris aperture value) of the zoom lens 12 which is in use. A digital computing circuit (microcomputer) 34 is arranged to read the contents of the ROM 32 according to the output of the A/D converter 30 and to supply applicable aberration information to the recording circuit 22.

The video camera shown in FIG. 1 operates as follows: The video signal processing circuit 20 performs in a known manner a video signal processing action on the signals output from the image sensors 14, 16 and 18. A color video signal thus obtained is supplied to the recording circuit 22. The potentiometers 24, 26 and 28 detect the conditions of the zoom lens 12 obtained at the time of shooting. The outputs of these potentiometers are digitized and supplied to the computing circuit 34. The computing circuit 34 then looks up a table stored in the ROM 32 according to the digital signals output from the A/D converter 30. An applicable aberration information code is read out from the ROM 32. The code thus read out is then supplied to the recording circuit 22 in a signal form suited to the recording process of the recording circuit 22. The use of the ROM 32 enables the embodiment to reduce the amount of the signal or that of data to be recorded on the video tape by the recording circuit 22 for the purpose of transmitting aberration information. However, it is of course possible to supply the analog data obtained from the potentiometers 24, 26 and 28 to the recording circuit 22 as it is as the aberration information code without digitizing it.

The recording circuit 22 is arranged to correlate the color video signal output from the video signal processing circuit 20 with the aberration information output from the computing circuit 34, for example, by frequency or time base multiplexing them and to record them on the video tape.

The lens information to be transmitted to the video tape includes the distance ring position, the focal length, the aperture value, the lens type (model number), and the parallel position deviation such as a relative position discrepancy which arises between channels when the image sensors 14, 16 and 18 are fixed to a spectral prism or is caused by the rattling, slanting and decentering taking place in a mechanical part. The lens information or data may be a design value or a measured value obtained upon completion of assembly work on the lens barrel.

Figure 2:
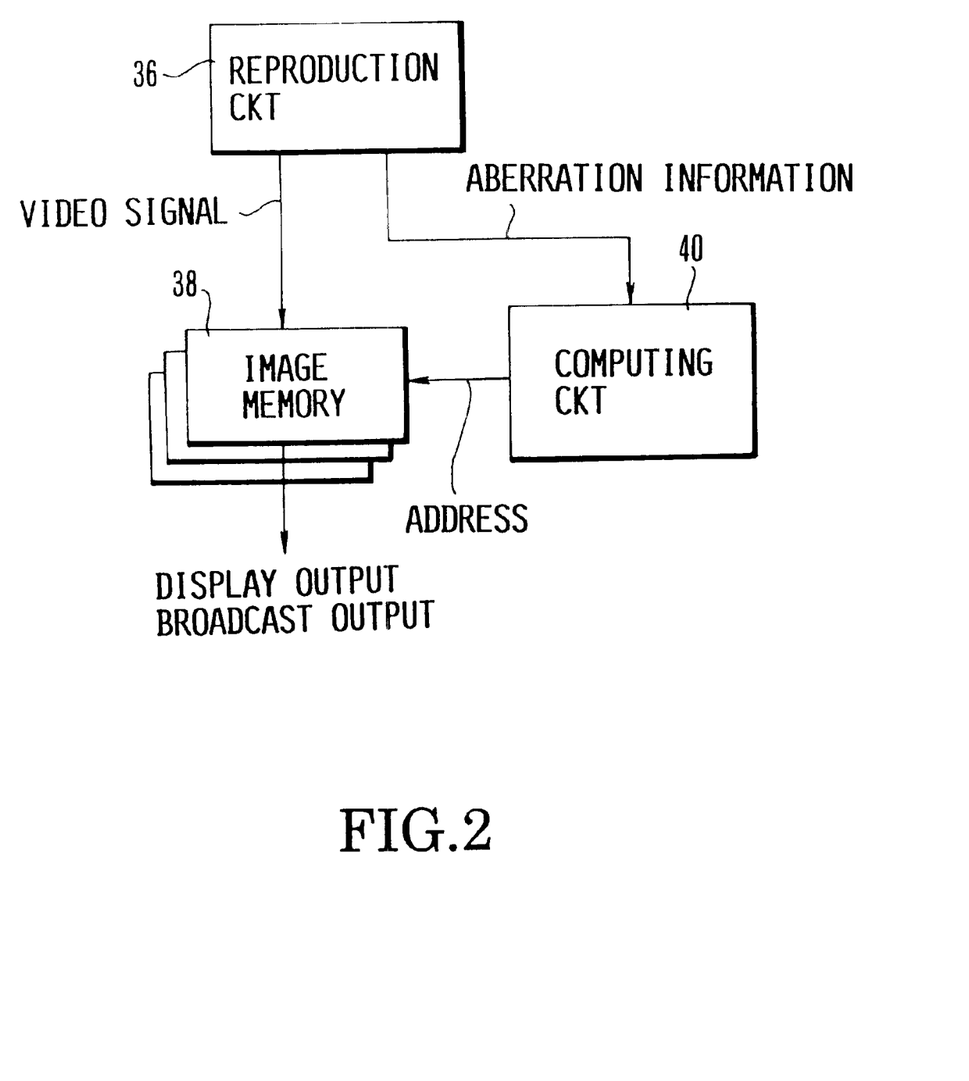
FIG. 2 is a block diagram showing the arrangement of a reproducing apparatus arranged also according to this invention.

FIG. 2 is a block diagram showing the arrangement of a system for reproducing and aberration-correcting the record of a video tape on which the video signal and the aberration information are recorded by the arrangement of FIG. 1. The system includes a reproduction circuit 36 which is arranged to reproduce the video signal and the aberration information from the video tape. An image memory 38 is arranged to have storage spaces for the channels of the colors R, G and B and to permit random access. A computing circuit 40 is arranged to generate a reading address for correcting any aberration in the image memory 38 according to the aberration information reproduced by the reproduction circuit 36.

The video signals of the color channels reproduced by the reproduction circuit 36 are separated from each other and are serially stored in the image memory 38 in the horizontal and vertical directions thereof. In other words, the writing address of the image memory 38 varies in the horizontal and vertical directions. In accordance with the aberration information output from the reproduction circuit 36, the computing circuit 40 two-dimensionally computes the shape of the generated aberration according to the aberration information output from the reproduction circuit 36 and generates the reading address for correcting the aberration. The video signal is thus read out from the image memory 38 in such a way as to correct through the reading address the aberration which took place at the time of photo taking, or shooting.

Figure 3:
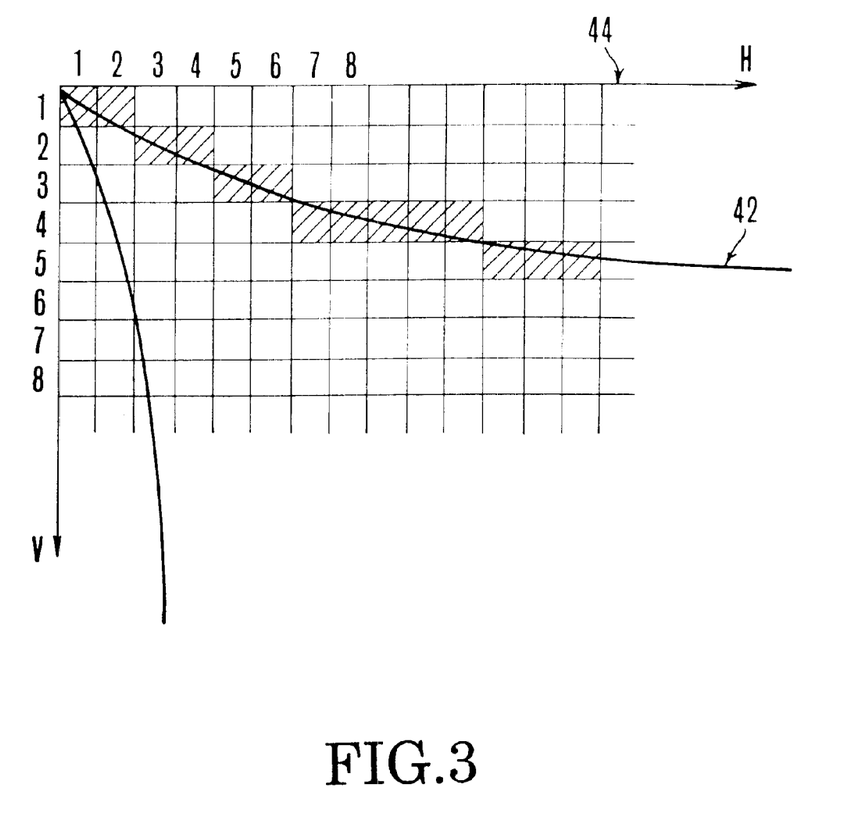
FIG. 3 shows the storage addresses of an image memory which is included in FIG. 2.

The manner in which the image memory 38 is accessed is described as follows with reference to FIG. 3: In FIG. 3, a distortion curve 42 indicates the shape of the image distortion resulting from the state of the lens at the time of shooting. A line 44 represents the horizontal line of the two-dimensional allocation of image data stored in the image memory 38. Assuming that the horizontal line 44 is distorted as represented by the curve 42 by the aberration of the photo-taking lens and that the picture element addresses in the vertical and horizontal directions V and H are expressed as Pi,j, the picture element data are read out along the distortion curve 42 as the image data are stored in the image memory 38 with the true horizontal line 44 warped by the photo-taking lens to a shape as represented by the distortion curve 42. Referring to FIG. 3, the picture element data are thus read out one after another in the order of hatched picture elements P1,1, P1,2, P2,3, P2,4 P3,5, P3,6, - - - . Upon completion of reading one line amount of data in the horizontal direction, the addresses in the vertical direction are changed to correct image distortion, of course, in the vertical direction. An image distortion in the horizontal direction is of course corrected in the same manner.

In reading the picture element data from the image memory 38, picture quality can be improved by performing interpolation between adjacent picture elements. Further, while the aberration is corrected in reading the data from the image memory 38, the aberration correcting process may be changed to be likewise performed in writing the data into the image memory 38.

In accordance with the arrangement shown in FIGS. 1 and 2, the image recording and image reproduction can be accomplished in different places of operation. Therefore, the camera can be arranged to be small in size and light in weight for taking high-quality pictures. The system arrangement is advantageous particularly for outdoor shooting. It is also applicable to a case where each cut of pictures taken and recorded by a HDTV (high-definition TV) system or the like is to be printed. In this case, the aberration correction does not have to be carried out in real time. Therefore, the image memory 38 and the computing circuit 40 can be allowed to operate at a relatively low speed by using, for example, a general purpose computer.

While the image and aberration information are arranged to be transmitted by means of a video tape in the case of the arrangement shown in FIGS. 1 and 2, the arrangement may be changed to transmit the information by radio transmission. In that case, the camera part still can be arranged in small size and light weight. An example of such arrangement is shown in FIG. 4.

Figure 4:
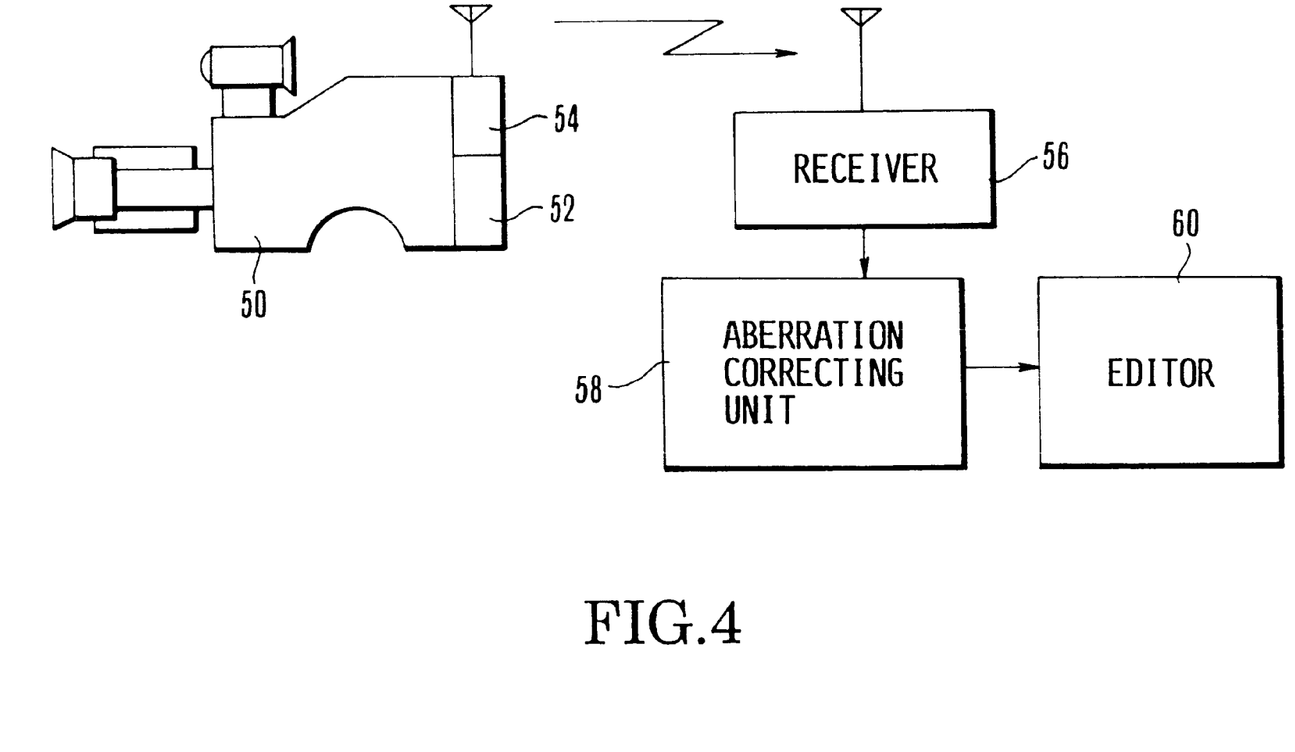
FIG. 4 is a block diagram showing the arrangement of another embodiment of the invention which uses a radio transmission device.

FIG. 4 is a block diagram showing in outline the above-stated radio transmission arrangement as an embodiment of this invention. In FIG. 4, a reference numeral 50 denotes a portable video camera. The video camera 50 is provided with the potentiometers 24, 26, 28, the A/D converter 30, the ROM 32 and the computing circuit 34 of FIG. 1. In addition to them, the video camera 50 includes an aberration information encoder 52 which is arranged to produce a signal indicating aberration information obtained at the time of shooting, and a transmission circuit 54 which is arranged to send out by radio transmission the aberration information signal of the encoder 52 along with a video signal obtained by shooting. The signal transmitted by the transmission circuit 54 is received by a receiver 56. Then, the aberration correction is carried out by an aberration correcting unit 58 which includes the image memory 38 and the computing circuit 40 of FIG. 2. An editor 60 is arranged to be used for editing the aberration-corrected video signal which is supplied from the aberration correcting unit 58.

In the case of the arrangement shown in FIG. 4, aberration correction is not performed on the side of the camera. Therefore, the camera 50 can be arranged small in size and light in weight for obtaining high-quality images. This arrangement is highly advantageous, for example, in cases where the camera is carried around outdoors for shooting a marathon race by relay transmission and where the camera is used for an unattended monitor system.

The invention is applicable to the prevention of image shaking caused by the vibrations of the camera holding hands and also to the correction of an image shake taking place in shooting with a lens of a long focal length. In the case of shooting with the camera held by hand, the camera is shaken by the breathing or walking movement of the camera operator. The shaking of the camera tends to show a salient picture shake particularly in the event of a lens of a long focal length. A method for detecting such picture shaking from a reproduced video signal and to correct it on a memory has been disclosed by an article entitled "Picture Shake Correcting Device" and appeared in the Journal of TV Society, Vol 111, No. 3, p 43–48, PROE '87-12 (May, 1987). In accordance with this method, however, the shake must be detected from a picture reproduced. This not only requires the use of a large piece of hardware but also tends to cause an error in the case of an image having a low degree of contrast. Besides, it tends to be affected by the jitters, etc. of the video tape.

Figure 5:
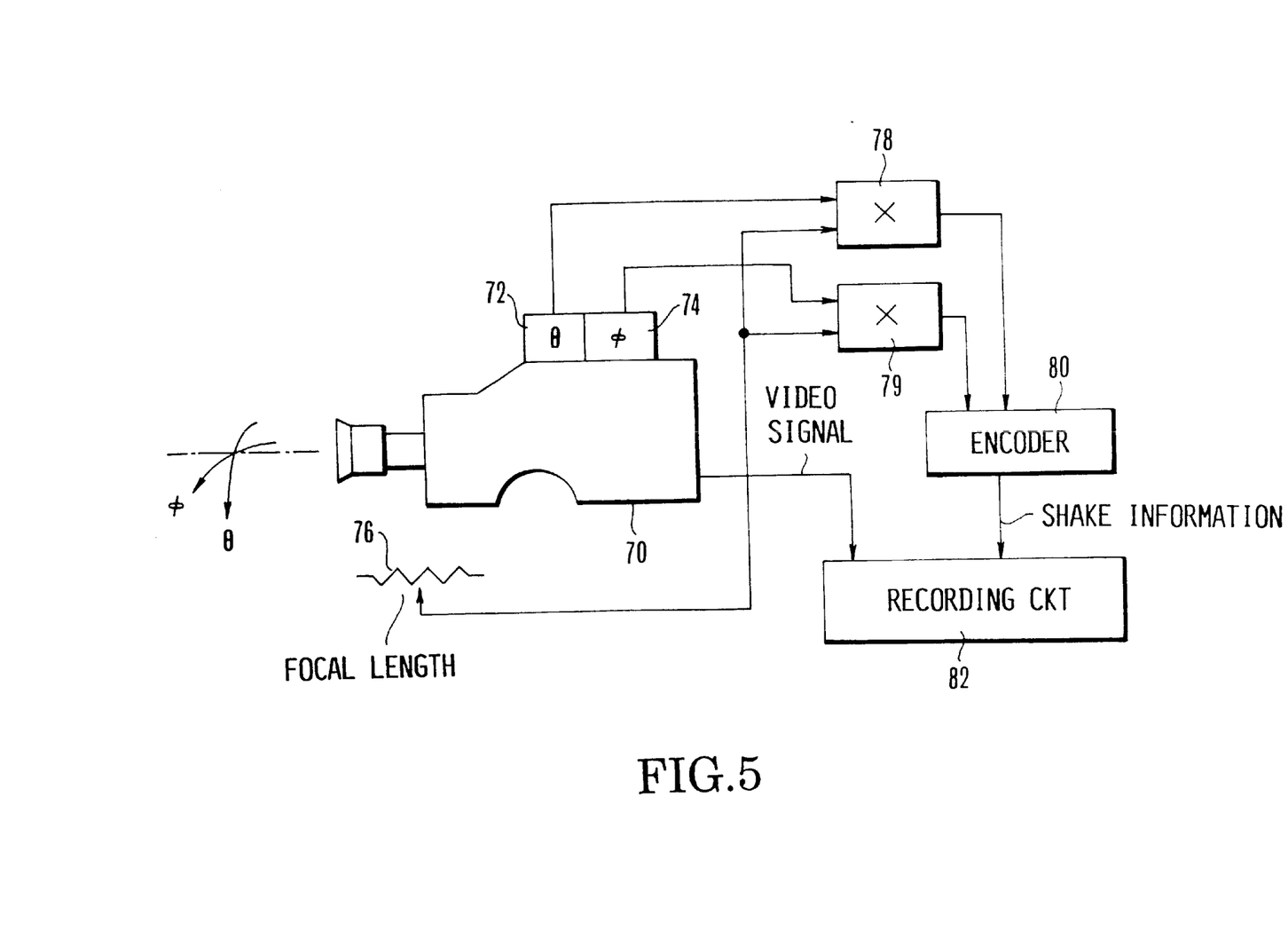
FIG. 5 is a block diagram showing the arrangement of a photo-taking and recording apparatus arranged according to this invention to perform shake correction.

FIG. 5 is a block diagram showing the arrangement of the photo-taking/recording part of an embodiment of this invention which solves these problems of the prior art. Referring to FIG. 5, a camera body 70 is provided with gyro-sensors or vibration sensors 72 and 74 which are secured to the camera body 70. The sensors 72 and 74 are arranged to detect the horizontal rotation angle Θ and the vertical rotation angle ∅ of the camera body 70. The shaking degree of the picture due to the rotation (or shake) of the camera is proportional to the product of the rotation angle of the camera and the focal length of the lens. Therefore, the focal length is obtained by the potentiometer 76 and the product of the rotation angles θ and φ by multipliers 78 and 79. The encoder 80 obtains information on the shake of the camera from the outputs of the multipliers 78 and 79 and supplies it to the recording circuit 82 by encoding it. Meanwhile, the video signal obtained by the camera body 70 is also supplied to the recording circuit 82. The recording circuit 82 records the shake information from the encoder 80 on the video tape along with the video signal from the camera body. Although it is not shown, aberration information of course may be also supplied to the recording circuit 82 to be recorded also on the video tape in the same manner as described in the foregoing.

To correct the above-stated image shake, the record of the video tape on which the video signal and the shake information are recorded by the recording circuit 82 is reproduced by a reproducing device. Then, the video signal reproduced is first stored in the image memory. After that, in accordance with the shake information reproduced, the position of the reading area of the image memory to be read out is shifted in the horizontal and vertical directions to an angular extent corresponding to the shaking angle in the direction opposite to the direction of the shake. This arrangement of course may be changed to shift the position of the writing area, of the image memory to be written, instead of the reading area, to the degree of an angle corresponding to the shake in the opposite direction. In correcting the picture shake, the correcting process can be performed in the same manner for all the color channels. Besides, the shake correction can be accomplished without many complex computing operations, so that the embodiment can be arranged with a simple hardware arrangement.

As apparent from the foregoing description, the embodiment is arranged to correct the image distortion during the process of reproduction in accordance with aberration information which indicates any aberration that takes place at the time of shooting in cases where the image distortion results from the aberration of the photo-taking lens. Therefore, the invented arrangement gives a high-quality picture by minimizing the image distortion. Another advantageous feature of the invention resides in that: The aberration correcting circuit is arranged discretely from the camera. Therefore, the size and weight of the camera can be prevented from increasing. It is a further advantage of the invention that the image shake resulting from the shaking of the camera is corrected at the time of reproduction, so that images can be stably reproduced even in cases where a lens of a long focal length is used.

What is claimed is:

1. A system for transmitting an image signal to another device comprising:

a) an image pickup lens system disposed in a camera;

b) image sensing means for converting an image formed on an image pickup plane by said image pickup lens system to an image signal;

c) memory means disposed in the camera for storing information relative to a characteristic of said image pickup lens system of said camera;

d) data combining means for combining the image signal and the information on the basis of a predetermined format adaptive to the recording and correcting operation of the image signal;

e) transmitting means for transmitting an output signal of said data combining means;

f) decoding means disposed in said another device for decoding a transmitted signal by said transmitting means to separate the image signal and the information; and g) correcting means disposed in a reproducing device in said another device, said correcting means being arranged to correct the image signal according to the information transmitted by said data combining means.

2. A system according to claim 1, wherein said image signal which indicates a photo-taking state includes information on an aberration.

3. A system according to claim 1, wherein said image signal which indicates a photo-taking state includes information on a shaking of said camera.

4. An image pick-up system, comprising:
 a) an image input device arranged to input an image and to output an image signal corresponding to the image;
 b) a memory disposed in said image input device and arranged to store correcting information of aberration characteristics of an optical system of said image input device;
 c) transmission means arranged to mix the image signal and the correcting information read out of said memory in a predetermined format to be converted into a transmissible form;
 d) a recording and reproducing device for recording a mixed image signal transmitted by said transmission means on a recording medium and reproducing the mixed image signal and decoding the image signal and the correcting information; and
 e) correcting means for correcting the reproduced image signal on the basis of the decoded correcting information when said image signal is reproduced from said recording medium.

5. A system according to claim 4, wherein said correcting information includes aberration information concerning a distortion aberration, a color aberration, and shading of an optical system.

6. A system according to claim 4, wherein said image input device is a camera part including a lens optical system and an image pick-up device.

7. A system according to claim 6, wherein said recording and reproducing device is arranged to record or reproduce an image signal outputted from said camera part from said recording medium.

8. An image processing device, comprising:
 a) image input means arranged to input an image and to output an image signal corresponding to the image;
 b) movement detecting means arranged to detect a relative movement between a device body and the image and to output movement detecting information;
 c) transmission means arranged to convert the image signal and the movement detecting information into a form in which the image signal and the movement detecting information are mixed and transmissible in a predetermined format to transmit the converted image signal and the movement detecting information;
 d) a recording and reproducing device for recording the mixed image signal transmitted by said transmission means and the movement detecting information on a recording medium and for reproducing the recorded mixed image signal and decoding the image signal and the movement detecting information; and
 e) correcting means for correcting the movement of the reproduced image signal on the basis of the decoded movement detecting information at the time of reproducing the image signal from said recording medium.

9. A device according to claim 8, wherein said movement detecting means includes a vibration gyro sensor for detecting a vibration of a camera.

10. A device according to claim 8, wherein said correcting means includes a memory for storing said reproduced image signal and is arranged to correct the vibration by displacing the range of reading out the image signal from said memory in accordance with said movement information.

11. A device according to claim 8, wherein said movement detecting information includes focal length information of an optical system.

12. A system comprising a video camera and a separate reproducing device, said video camera comprising:
 a photo-taking optical system; and
 an image sensor for sensing an optical image obtained through said photo-taodng optical system; said system being characterized in that said video camera further comprises
 a transmitter for transmitting an image signal obtained by said image sensor and information on an aberration in the characteristics of said photo-taking optical system in a linked state; and said reproducing device comprising:
 a receiver for receiving, from said video camera, said image signal and said information on an aberration in the characteristics of said photo-taking optical system; and
 a corrector for correcting said image signal by using said signal indicating information on an aberration in the characteristics of said photo-taking optical system received by said receiver.

13. A system according to claim 12, characterized in that said signal indicating information on an aberration in the characteristics of said photo-taking optical system further comprises information on a shaking of said video camera.

14. A system according to claim 12 or 13, characterized in that said transmitter includes a signal sending circuit.

15. A system according to claim 12 or 13, characterized in that said corrector includes a memory.

16. A system according to claim 12 or 13, characterized in that said transmitter includes a memory.

17. A system according to claim 12 or 13, characterized in that said receiver includes a reproducing circuit.

18. A system according to claim 12 or 13, characterized in that said receiver includes a signal receiving circuit.

19. A system according to claim 12 or 13, characterized by further comprising a recorder for recording, on a recording medium, said image signal and said signal indicating information on an aberration in the characteristics of said photo-taking optical system.

20. A system according to claim 19, characterized by further comprising a reproducing circuit for reproducing said image signal and said signal indicating information on an aberration in the characteristics of said photo-taking optical system which are recorded on said recording medium.

21. A system according to claim 14, characterized in that said corrector includes a memory.

22. A system according to claim 21, characterized in that said transmitter includes a memory.

23. A system according to claim 22, characterized in that said receiver includes a reproducing circuit.

24. A system according to claim 23, characterized in that said receiver includes a signal receiving circuit.

25. A system according to claim 24, characterized by further comprising a recorder for recording, on a recording medium, said image signal and said signal indicating information on an aberration in the characteristics of said photo-taking optical system.

26. A system according to claim 25, characterized by further comprising a reproducing circuit for reproducing said image signal and said signal indicating information on an aberration in the characteristics of said photo-taking optical system which are recorded on said recording medium.

27. An image pickup camera, comprising;

a photo-taking optical system; and an image sensor for sensing an optical image obtained through said photo-taking optical system, said camera being characterized by further comprsing a transmitter for transmitting an image signal obtained by said image sensor and information on an aberration in the characteristics of said photo-taking optical system in a linked state.

28. A reproducing device, characterized by a receiver for receiving, from an image pickup camera, wherein said image pickup camera includes a photo-taking optical system and an image sensor for sensing an optical image obtained through said phot0-taking optical system, said camera being characterized by further comprising a transmitter for transmitting an image si obtained by said image sensor and information on an aberration in the characteristics of said photo-taking optical system in a liked state, the image signal and information on the aberration in the characterstics of said photo-taking optical system; and a corrector for correcting said image signal by using said signal indicating information on an aberration in the characteristics of said photo-taking optical system received by said receiving means.

29. A method for transmitting an image signal to another device comprising:

a) forming an image on an image pickup plane using an image pickup lens system disposed in a camera;

b) converting said image formed on an image pickup plane by said image pickup lens system to an image signal;

c) storing information in the camera, said information being relative to a characteristic of said image pickup lens system of said camera;

d) combining said image signal and said information on the basis of a predetermined format adaptive to the recording and correcting operation of the image signal;

e) transmitting an output signal of said data combining step;

f) decoding said transmitted signal in said another device to separate the image signal and the information; and g) correcting the image signal in a reproducing device in said another device, said correcting being according to the information transmitted in said transmitting step.

30. A method according to claim 29, wherein said image signal which indicates a photo-taking state includes information on an aberration.

31. A method according to claim 29, wherein said image signal which indicates a photo-taking state includes information on a shaking of said camera.

32. A method for reproducing transmitted image signal from an image pickup camera, wherein said camera includes forming an image on an image pickup plane using an image pickup lens system disposed in a camera, converting said image formed on an image pickup plane by said image pickup lens system to an image signal, storing information in the camera, said information being relative to a characteristic of said image pickup lens system of said camera, combining said image signal and said information on the basis of a predetermined format adaptive to the recording and correcting operation of the image signal, and transmitting an output signal of said data combining step, said method comprising;

decoding said transmitted signal in said another device to separate the image signal and the information; and correcting the image signal in a reproducing device in said another device, said correcting being according to the information transmitted in said transmitting step.

* * * * *

UNITED STATES PATENT AND TRADEMARK OFFICE
CERTIFICATE OF CORRECTION

PATENT NO.     : 6,476,869 B1
DATED          : November 5, 2002
INVENTOR(S)    : Masayoshi Sekine et al.

It is certified that error appears in the above-identified patent and that said Letters Patent is hereby corrected as shown below:

Column 9,
Line 19, delete "phot0-taking" and insert -- photo-taking --.
Line 22, after "image" insert -- signal --.
Line 24, delete "liked" and insert -- linked --.

Signed and Sealed this

Eleventh Day of November, 2003

JAMES E. ROGAN
*Director of the United States Patent and Trademark Office*